(12) United States Patent
Marcis et al.

(10) Patent No.: US 7,137,778 B2
(45) Date of Patent: Nov. 21, 2006

(54) VARIABLE TURBINE GEOMETRY TURBOCHARGER

(75) Inventors: Richard Marcis, Skyland, NC (US); Richard Hall, Marion, NC (US)

(73) Assignee: BorgWarner Inc., Auburn Hills, MI (US)

( * ) Notice: Subject to any disclaimer, the term of this patent is extended or adjusted under 35 U.S.C. 154(b) by 28 days.

(21) Appl. No.: 10/822,466

(22) Filed: Apr. 12, 2004

(65) Prior Publication Data

US 2005/0226718 A1    Oct. 13, 2005

(51) Int. Cl.
*F01D 9/04*   (2006.01)

(52) U.S. Cl. .............. 415/163; 415/164; 415/165

(58) Field of Classification Search ............ 415/160, 415/163–165

See application file for complete search history.

(56) References Cited

U.S. PATENT DOCUMENTS

| 4,232,992 | A | * | 11/1980 | Possell | 415/90 |
| 4,657,476 | A | * | 4/1987 | Berg | 415/48 |
| 6,419,464 | B1 | * | 7/2002 | Arnold | 417/407 |
| 6,672,059 | B1 | * | 1/2004 | Arnold | 60/602 |

\* cited by examiner

*Primary Examiner*—Ninh H. Nguyen
(74) *Attorney, Agent, or Firm*—Akerman Senterfitt; Greg Dziegielewski

(57) ABSTRACT

A turbocharger arrangement for a variable geometry turbocharger including pivotable vanes (34) with each vane (34) having a respective vane bore (38) for receiving a vane post (28) into a vane first planar surface (80) and a respective actuation post (36) projecting outwardly from the first planar surface (80).

28 Claims, 8 Drawing Sheets

VARIABLE TURBINE GEOMETRY TURBOCHARGER

TECHNICAL FIELD

The present invention relates to turbomachinery and more particularly to an improved turbocharger with an improved vane and post arrangement in which the vanes of a variable geometry turbocharger may be pivoted. The pivotable vanes each have a respective vane bore in a planar surface for receiving a vane post and a respective actuation post projecting outwardly from the same planar surface. The mechanism for pivoting the vanes may consist of coplanar rings.

BACKGROUND OF THE INVENTION

Turbochargers are widely used on internal combustion engines and, in the past, have been particularly used with large diesel engines, especially for highway trucks and marine applications.

More recently, in addition to use in connection with large diesel engines, turbochargers have become popular for use in connection with smaller, passenger car power plants. The use of a turbocharger in passenger car applications permits selection of a power plant that develops the same amount of horsepower from a smaller, lower mass engine. Using a lower mass engine has the desired effect of decreasing the overall weight of the car, increasing sporty performance, and enhancing fuel economy. Moreover, use of a turbocharger permits more complete combustion of the fuel delivered to the engine, thereby reducing the overall emissions of the engine, which contributes to the highly desirable goal of a cleaner environment.

The design and function of turbochargers are described in detail in the prior art, for example, U.S. Pat. Nos. 4,705,463, 5,399,064, and 6,164,931, the disclosures of which are incorporated herein by reference.

Turbocharger units typically include a turbine operatively connected to the engine exhaust manifold, a compressor operatively connected to the engine air intake manifold, and a shaft connecting the turbine and compressor so that rotation of the turbine wheel causes rotation of the compressor impeller. The turbine is driven to rotate by the exhaust gas flowing in the exhaust manifold. The compressor impeller is driven to rotate by the turbine, and, as it rotates, it increases the air mass flow rate, airflow density and air pressure delivered to the engine cylinders.

As the use of turbochargers finds greater acceptance in passenger car applications, three design criteria have moved to the forefront. First, the market demands that all components of the power plant of either a passenger car or truck, including the turbocharger, must provide reliable operation for a much longer period than was demanded in the past. That is, while it may have been acceptable in the past to require a major engine overhaul after 80,000–100,000 miles for passenger cars, it is now necessary to design engine components for reliable operation in excess of 200,000 miles of operation. It is now necessary to design engine components in trucks for reliable operation in excess of 1,000,000 miles of operation. This means that extra care must be taken to ensure proper fabrication and cooperation of all supporting devices.

The second design criterion that has moved to the forefront is that the power plant must meet or exceed very strict requirements in the area of minimized $NO_x$ and particulate matter emissions. Third, with the mass production of turbochargers, it is highly desirable to design a turbocharger that meets the above criteria and is comprised of a minimum number of parts. Further, those parts should be easy to manufacture and easy to assemble, in order to provide a cost effective and reliable turbocharger.

Turbocharger efficiency over a broad range of operating conditions is enhanced if the flow of motive gas to the turbine wheel can be controlled, such as by making the vanes pivotable so as to alter the geometry of the passages therebetween. The design of the mechanism used to effect pivoting of the vanes is critical to prevent binding of the vanes. Other considerations include the cost of manufacture of parts and the labor involved in assembly of such systems.

Prior art mechanisms that attempt to provide reliable mechanisms to this end include U.S. Pat. No. 4,770,603 which discloses an exhaust gas turbocharger comprising a turbine with a guide apparatus including an array of guide vanes arranged concentrically around a rotor axis and pivotable between two end limits and an adjusting mechanism for pivoting the vanes. A first "securing" ring is arranged at the side of a bearing housing for mounting a first trunnion of each guide vane that is also mounted at the side of an oppositely disposed turbine housing. The arrangement makes possible a compact construction that can be fabricated at reduced cost and assembled easily. This is achieved by an assembly containing the guide apparatus and the adjusting mechanism. Further, the assembly includes a second securing ring arranged at the side of a turbine housing for mounting a second trunnion of each guide vane.

However, the above mentioned design of Engels, for example, contains numerous moving parts that must not only be fabricated individually, but that are also costly to assemble, require more maintenance, and have higher failure rates than are desired. In addition, friction wear can be a problem with such a design.

Subsequent efforts in this area have included the approach disclosed in U.S. Pat. No. 6,419,464 (Arnold). The vanes of Arnold are pivoted by two posts extending from opposite surfaces of the vanes. A pivot post is received in a respective hole in one vane surface whereas an actuation post extends from the other side of the vane and is received by a ring. When the ring is pivoted, the actuation post extending from the vane is moved, and, because the pivot post is spatially fixed, the vane is pivoted. In operation under flow conditions, the vanes are under significant forces due to (1) the motive gas, (2) the force applied to pivot the vanes through the actuation post, and (3) the force on the vane about the pivot post. These forces result in a cantilevered load on the vanes which introduce stress in the vanes and the various posts. Over hundreds of thousands of turbocharger cycles, the vanes ultimately become torqued due to the cantilevered loads and hystereis. Over time, the vanes will become begin to deform and stick and ultimately break or lock.

The present inventors thus saw a need for a mechanism to provide a variable geometry turbocharger providing extremely high reliability, being cost efficient and inexpensive to manufacture, and that did not possess the negative qualities of the prior art mechanisms.

SUMMARY OF THE INVENTION

The inventors solved the problems of the prior art by redesigning the variable geometry turbocharger components such that the posts that actuate the vanes of a turbocharger may be situated away from the turbine housing and on the same side of the vane, among other improvements.

Variable turbine geometry turbochargers typically comprise a turbine housing having an exhaust gas inlet and an outlet, a volute connected to the inlet, and a nozzle wall adjacent the volute (collectively referred to as the exhaust gas supply channel). A turbine wheel is carried within the turbine housing and is attached to a shaft.

An array of pivotable vanes are situated within the turbine housing adjacent the nozzle wall and positioned between the exhaust gas inlet and the turbine wheel. As exhaust gas passes through the supply channel to the turbine wheel, the exhaust gas flow can be controlled by pivoting the vanes to be more or less open.

The vanes of the present invention have posts which extend from a planar vane surface and they also receive a post on the same planar vane surface so that the cantilevered loads of the Arnold vanes are avoided. Such vanes are advantageous over previous vanes in that they are less likely to stick even under hundreds of thousands of turbocharger cycles.

The vanes may be pivoted by the use of two concentric rings, a static ring and an actuator ring. Although it is preferred that one of the rings be stationary with the other ring being pivotable, it is within the scope of the present invention for both rings to be pivotable. It is also preferred that the rings be concentric with a common planar surface.

As noted above, the static ring and actuation ring are linked to the vanes by posts, these posts may be fixed in a respective ring, or pivotably received in a ring or vane.

In a preferred embodiment, the actuator ring has a plurality of actuation slots which each receive a respective actuation post while the static ring pivotably receives a vane post (the other ends of the posts being received by respective vanes). When the actuator ring is pivoted with respect to the static ring, the actuation posts slide in respective actuation slots causing the actuation posts to be moved radially. By this radial movement, the vanes are pivoted about their respective vane posts. It is also within the scope of the present invention for the static ring to have slots (or even both rings).

In a further preferred embodiment, each respective actuation slot receives a respective sliding block which, in turn, receives a respective actuation post. When the actuator ring is pivoted with respect to the static ring, the sliding blocks are caused to move, thereby causing each respective actuation post to move). When the actuation post is caused to move, the respective vanes are pivoted about their respective vane post. One benefit of utilizing the sliding blocks is that the sliding blocks present a larger contact surface with the actuation slot and therefore have a longer lifespan than other embodiments without such members.

A further advantage of the present invention is that hysteresis assists in the closing of the vanes, because of a pressure reversal that may take place due to the flow around the vanes as they are pivoted from the open position to the closed position.

The invention tends to eliminate binding of the variable geometry system and maintains the actuator ring and static ring concentrically aligned during operation.

BRIEF DESCRIPTION OF THE DRAWINGS

For a more complete understanding of the nature and objects of the present invention, reference should be made to the following detailed description taken together with the accompanying drawings, in which.

DETAILED DESCRIPTION OF THE INVENTION

Figure 1:
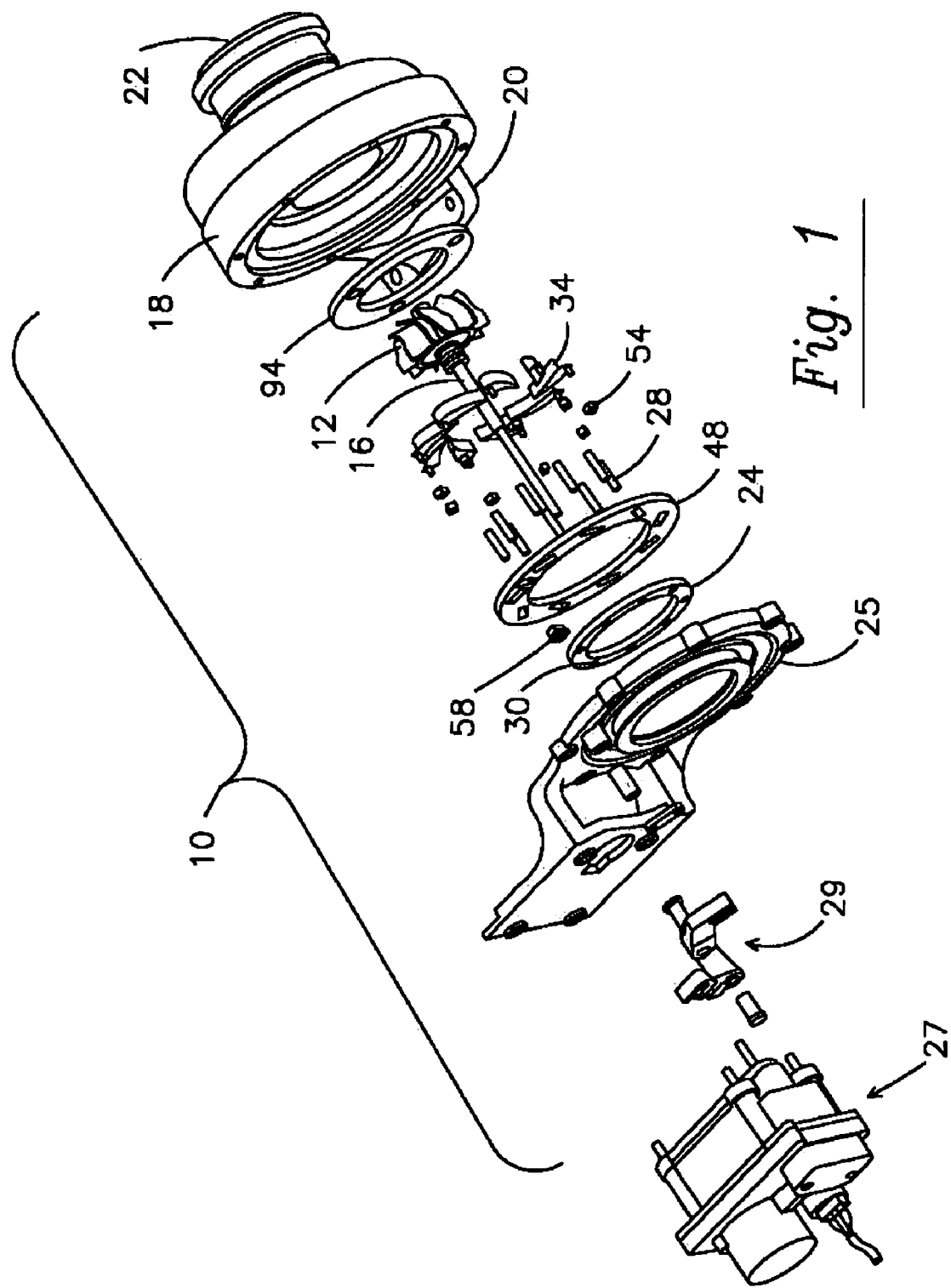
FIG. 1 illustrates an embodiment of the present invention.

A turbocharger system as shown in FIG. 1 includes turbomachinery in the form of a turbocharger 10 generally comprising a turbine wheel 12 and a compressor impeller (not shown) mounted on opposite ends of a common shaft 16. The turbine wheel 12 may be disposed within a turbine housing 18 that includes an inlet 20 for receiving exhaust gas from an engine and an outlet 22 for discharging the exhaust gas. The turbine housing 18 guides the engine exhaust gas into communication with and expansion through the turbine wheel 12 for rotatably driving the turbine wheel 12. Such driving of the turbine wheel 12 simultaneously and rotatably drives the compressor impeller that may be carried within a compressor housing (not shown).

FIG. 1 shows a variable turbine geometry turbocharger with the turbine housing 18 having an exhaust gas inlet 20 and an outlet 22, a volute connected to the inlet 20, and a nozzle wall adjacent the volute (collectively referred to as the exhaust gas supply channel). A turbine wheel 12 is carried within the turbine housing and is attached to a shaft 16.

An array of pivotable vanes 34 are situated within the turbine housing 18 adjacent the nozzle wall and positioned between the exhaust gas inlet 20 and the turbine wheel 12. As exhaust gas passes through the supply channel to the turbine wheel 12, the exhaust gas flow can be controlled by pivoting the vanes 34 to be more or less open.

After impacting the turbine wheel 12, the exhaust gas flows axially through the turbine shroud and exits the turbocharger 10 through outlet 22 into either a suitable pollution-control device or the atmosphere.

The turbine housing 18 may be mounted to a flange 25 which may, in turn, be mounted to a center housing (not shown), or which could be a part of it. A compressor housing may be mounted on the other side of the center housing.

Figure 2:
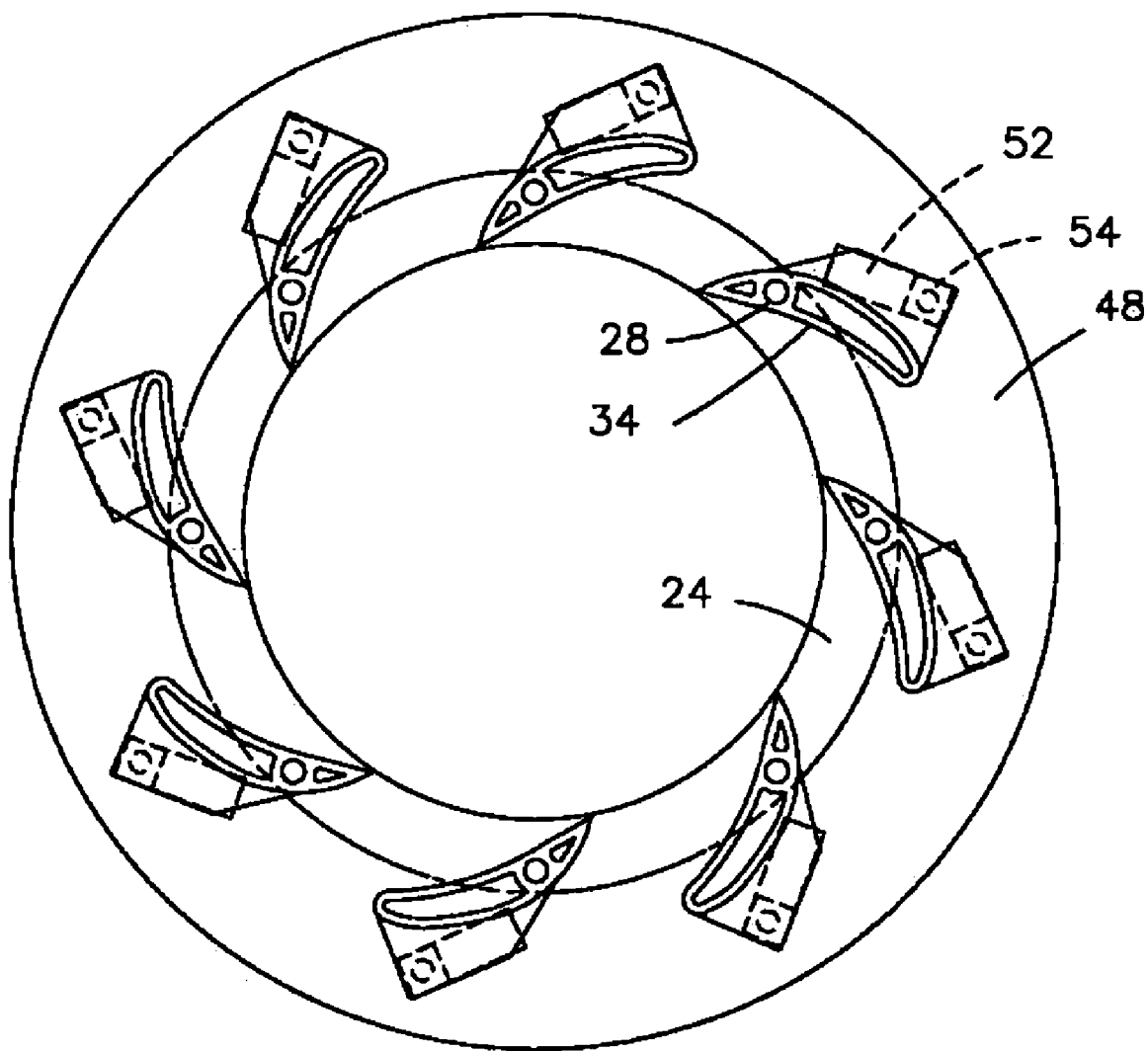
FIG. 2 illustrates a perspective view of an embodiment of the present invention.
Figure 4A:
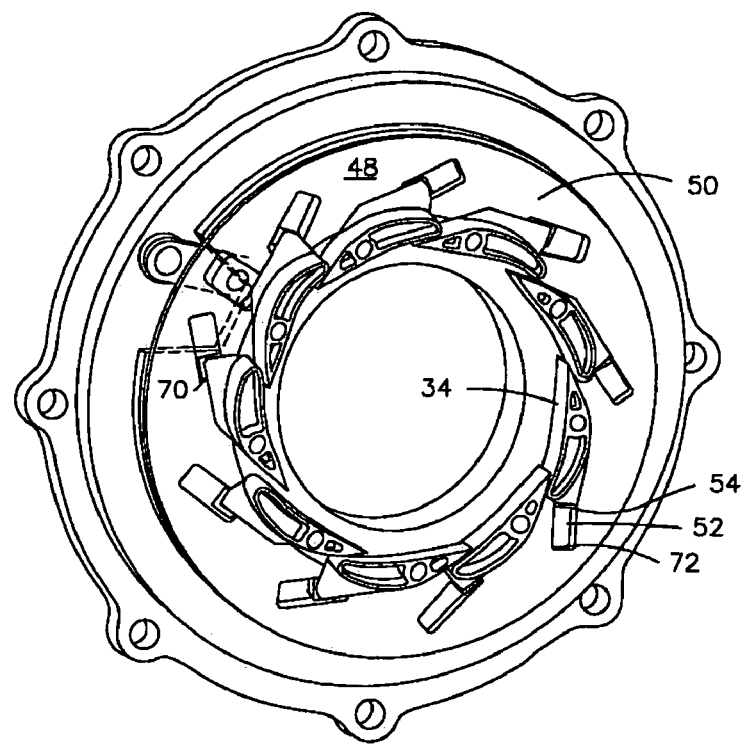
FIGS. 4a and 4b are further perspective views that illustrate portions of the present invention in a closed (3a) and open position (3b)
Figure 4B:
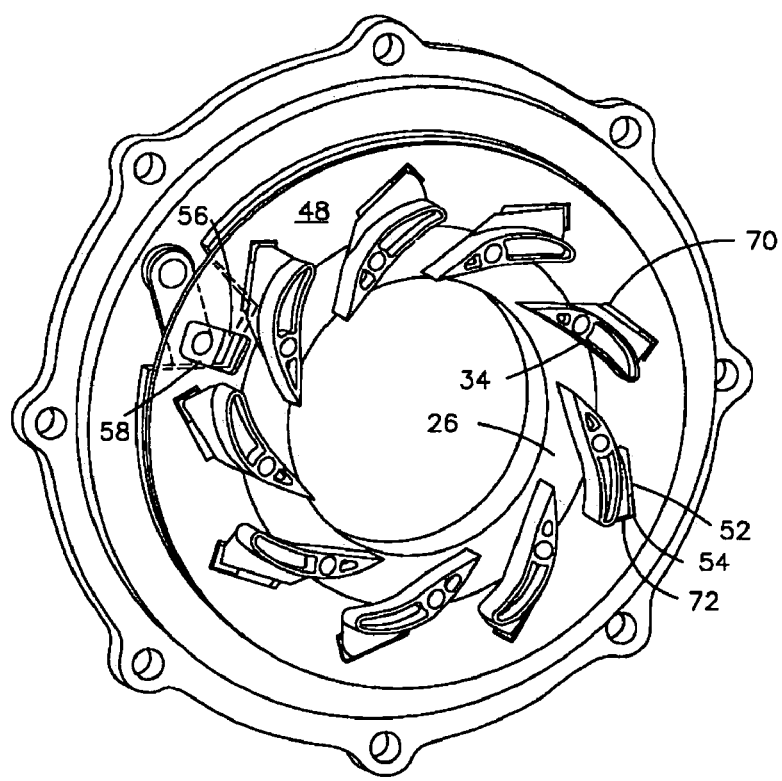

FIG. 2 is illustrative of an example of a simple embodiment of the present invention. In this embodiment, a first ring or a ring of elements defining static pivot points or a static ring 24 (which may also be affixed to the turbine housing or flange 25 but that could also be pivotable) may be situated concentrically with a second ring or a ring of actuation elements or actuator ring 48. An array of vanes 34 may be situated such that the vanes 34 may be positioned adjacent the two rings (24, 48), as also shown in FIGS. 4a and 4b. Although the rings may be presented as having a co-planar surface, this is not required. It is also perfectly acceptable to have the outer ring as the static ring 24 and the pivotable actuator ring 48 on the inside. Further, both rings (24, 48) may be pivotable. Pins or vane posts 28 may extend between the static ring 24 and the vanes 34. Pins or actuation posts 36 may also extend between the actuator ring 48 and the vanes 34 such that when one of the rings (24, 48) is rotated relative to the other ring (24, 48), the vanes 34 pivot. Note that although the rings (24, 48) are illustrated in a preferably coplanar relationship, this is not required for the mechanism to function. All that is required is that the vanes 34 are connected to the rings (24, 48). Thus, the rings (24, 48) may be situated on opposite sides of the vanes 34 and it is not necessary that they be co-planar.

Figure 3A:
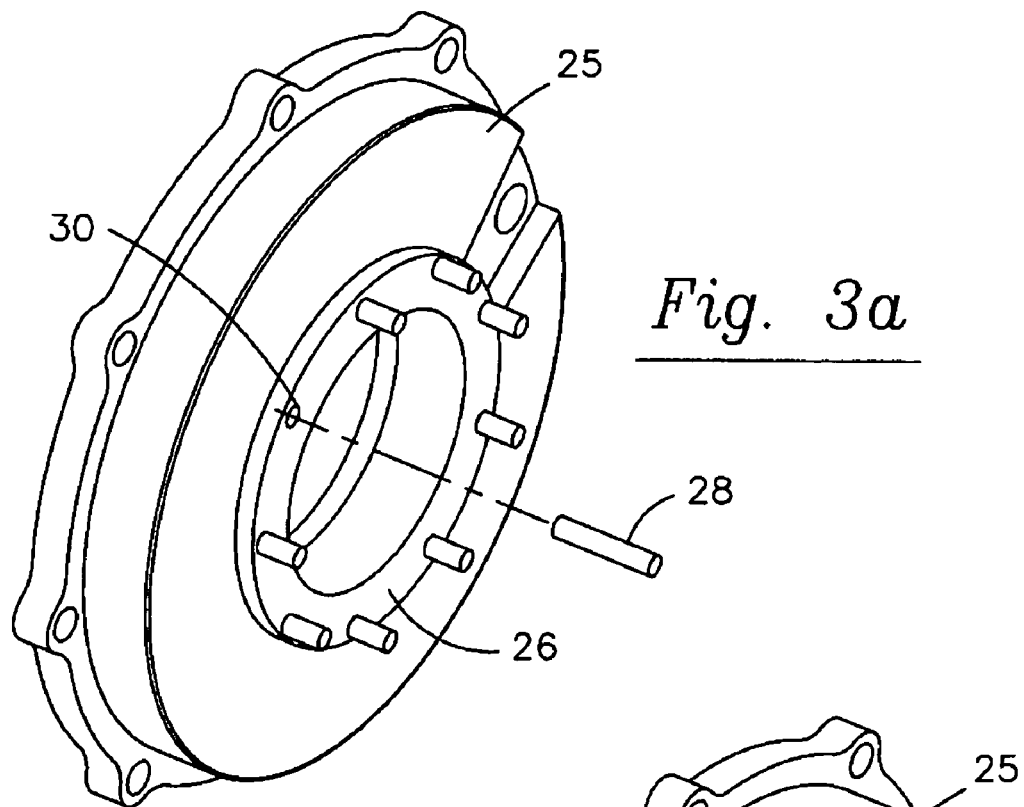
FIG. 3a is a perspective view of an embodiment of a static ring.
Figure 3B:
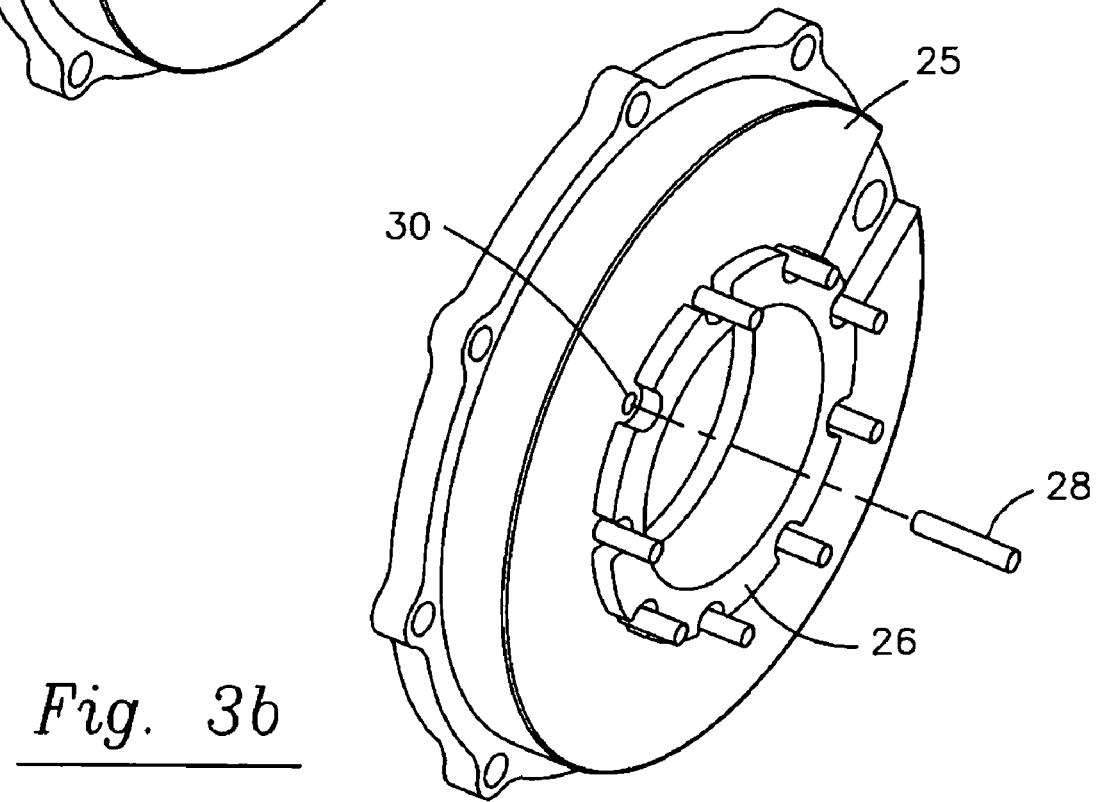
FIG. 3b is a perspective view of an embodiment of a static ring.

In FIGS. 3a and 3b, alternate embodiments are shown. These embodiments illustrate that the static ring 24 may be affixed to the flange 25. Note that the vane posts 28 may be received in either the static ring 24 (FIG. 3a) or in the flange 25 (FIG. 3b). In addition, the area surrounding the vane posts 28 may be recessed as in FIG. 3b or otherwise modified as long as the vane posts 28 are kept in relative position to the static ring 24 or flange 25 and extend to the vanes 34. FIGS. 4a and 4b illustrate an actuator ring 48 with an actuator ring first surface 50 that may be situated concentrically with the static ring 24 (with respective static ring first surface 26) and that may be located radially as illustrated. Together, the static ring first surface 26 and the actuator ring first surface 50 define one of the axial extents of the annular passage. The other axial extent may be defined by the turbine housing first surface 14 (if there is no insert ring 94), or, in an alternate embodiment, by a turbine housing insert ring (nozzle ring) first surface 96 of a turbine housing insert ring 94. Other potential benefits of the turbine housing insert ring 94 include providing a temperature buffer between the vanes 34 and the extremely hot turbine housing 18 (thus it is preferable that the material of the turbine housing insert ring 94 be well insulating).

The actuator ring 48 contains a plurality of slots 52 for receiving respective sliding blocks 54 and may include a main actuation slot 56 for a main actuation block 58.

Multiple vane posts 28 may project perpendicularly outward from the static ring 24. In a preferred embodiment, these vane posts 28 may be press-fit into static ring bores 30 in the static ring 24 or, alternatively, into the flange 25. A respective vane 34 may be mounted to be capable of pivoting on a respective vane post 28. Each vane 34 also includes an actuation post 36 that extends into a respective sliding block hole 60 in a respective sliding block 54. The respective sliding block 54 may then be received into a respective slot 52 in the actuator ring 48.

As shown in FIG. 1, an actuator assembly may be connected with the actuator ring 48 and thereby configured to pivot the actuator ring 48 in one direction or the other as necessary to move the vanes 34 radially, with respect to an axis of rotation of the respective vane post 28, outwardly or inwardly to respectively increase or decrease the local exhaust gas velocity to the turbine wheel 12. In order to pivot the vanes 34, any suitable actuator may be utilized. As illustrated in FIG. 1, a rotary electric actuator 27 may be utilized, though it is perfectly acceptable and within the scope of this invention to utilize a pneumatic, hydraulic, electronic, or other actuator. As illustrated, a linkage mechanism 29 may preferably be utilized to transfer the rotational motion of the rotary electric actuator shaft to the actuator ring 48.

As the actuator ring 48 is pivoted, the actuation posts 36 (in their respective sliding block 54 in a preferred embodiment) may be caused to move within their respective slot 52 from a slot first end 70 to a slot second end 72. Because the slots 52 are preferably oriented with a radial directional component along the actuator ring 48, the movement of the actuation posts 36 (and respective sliding block 54) within the respective slot 52 causes the vanes 34 to pivot via rotation of their respective vane post 28 and to open or close the nozzle area depending on the actuator ring 48 rotational direction. As discussed further below, FIGS. 4a and 4b illustrate the extreme positions regarding the vane 34 configurations.

The plurality of pivotable vanes 34 that operate to vary the geometry of the annular passage thereby control the angle at which the exhaust gas impacts the blades of the turbine wheel 12. This, in turn, controls the amount of energy imparted to the compressor wheel and, ultimately, the amount of air supplied to the engine.

The vane posts 28 may be rotationally fixed in either the static ring 24 or the vane 34.

As illustrated in FIG. 5a–5k, each vane 34 may include an actuation post 36 that projects from the same side as a vane bore 38. Note that although the vane bore 38 is illustrated as extending through the entire vane in several of the figures, this is not necessary. The vane bore 38 may be a blind hole such that the opposite vane surface is not pierced as in FIG. 5b and 5f. The respective actuation post 36 may then be received by a respective sliding block hole 60 of a sliding block 54. The respective sliding block 54 may then slidably received into a respective slot 52 in the actuator ring 48.

FIGS. 4a and 4b illustrate the general movement pattern of vanes 34 when pivoted by the actuator ring 48. Depending on engine conditions, the vanes 34 can either be opened more or less to increase or decrease the velocity of the flow to the turbine wheel. Each actuation post 36 may be disposed within a respective sliding block 54 which may then be disposed in a respective slot 52 of the actuator ring 48. In a closed position (FIG. 4a), the sliding block 54 (and, thus, the actuation post 36 as well) may be positioned adjacent to the slot first end 70 of the respective slot 52 (the "closed" position).

At an intermediate position (not shown), the actuator ring 48 may be pivoted a sufficient amount such that the actuation post 36 may be moved within the slot 52, away from the slot first end 70, and towards a middle position of the slot 52. The actuation post 36 movement may be provided by the pivoting action of the vane 34 relative to the vane post 28, allowing the vane 34 to be pivoted a given extent. At this intermediate position, the intermediate radial projection of the vane 34 serves to decrease the local exhaust gas velocity to the turbine wheel 12 when compared to the closed position (FIG. 4a).

In FIG. 4b, the actuator ring 48 has been pivoted to a maximum position, causing the actuation post 36 to be moved within the slot 52 to the slot second end 72. Again, such further vane movement may be facilitated by the pivoting arrangement between the vane 34 and the vane post 28, allowing the vane 34 to be pivoted to a maximum open position. At the open position, the maximum radial projection of the vane 34 serves to decrease the local exhaust gas velocity to the turbine wheel 12 when compared to the intermediate position.

As mentioned above, proper operation of a variable geometry turbocharger requires that the vanes 34 be permitted to pivot freely when pivoted by the actuator ring 48. Such free pivoting movement requires that the actuation posts 36 and vane posts 28 not bind or otherwise be restricted in their rotational movement. For this reason, it is desirable that the actuation posts 36 and vane posts 28 be perpendicular to the vane first planar surface 80 and be located opposite the turbine housing side of the turbocharger.

FIGS. 5a–5k illustrate a vane 34 for use with a variable geometry turbocharger, constructed according to principles of this invention, comprising a vane first planar surface 80, a vane second planar surface 82, a first pressure surface 84 and a second pressure surface 86. Taken together, these pressure surfaces 82 and 86 define a footprint of the vane 34. These vane surfaces may be defined relative to the vane placement within the turbine housing 18. The vane 34 includes a leading edge 90 and a trailing edge 92 at opposite common ends of the first and second pressure surfaces 84 and 86, respectively. The vane 34 includes an actuation post 36 projecting outwardly from the vane first planar surface 80 and the vane post 28 may be preferably positioned near the leading edge 90. In a further preferred embodiment, the actuation post 36 may be situated such that it lies outside the footprint. One advantage to such a configuration is that less force is required to pivot the vane. Also note that it is preferable to provide a vane extension 98 that reduces the amount of motive gas which would otherwise flow by or bypass the vanes 34. By use of the vane extensions 98, the slots 52 are covered thus forcing more air to the vanes 34. The actuation post 36 may be configured to cooperate with a respective sliding block 54 which then cooperates with a respective slot 52 in the manner described above to facilitate vane actuation.

Figure 5A:
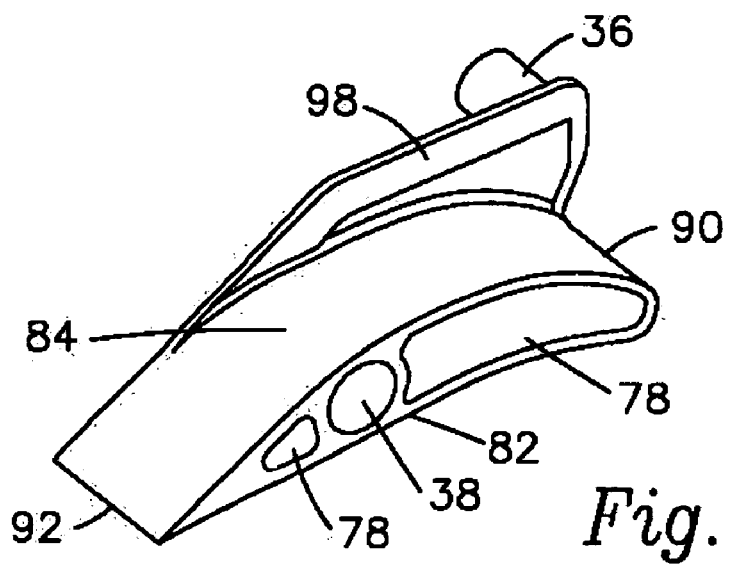
FIGS. 5a, 5b, 5c, 5d, 5e, 5f, 5g, 5h, 5i, 5j and 5k are perspective views of preferred embodiments of various vanes that are part of the subject matter of this invention.
Figure 5B:
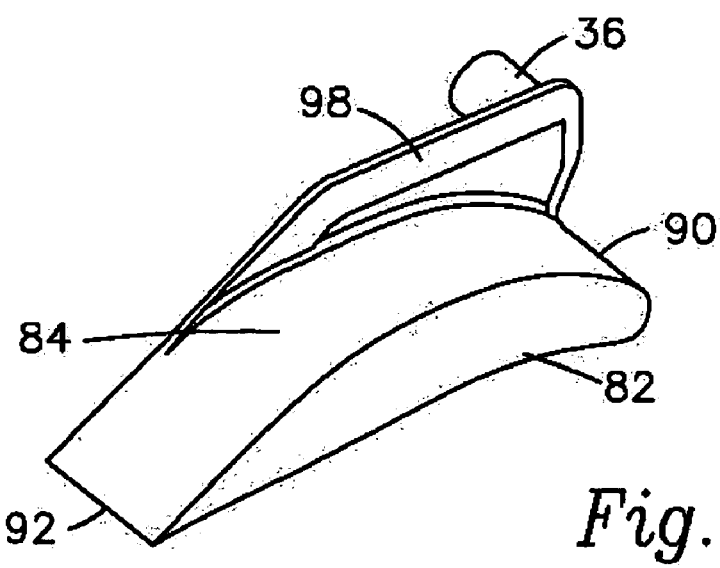
Figure 5C:
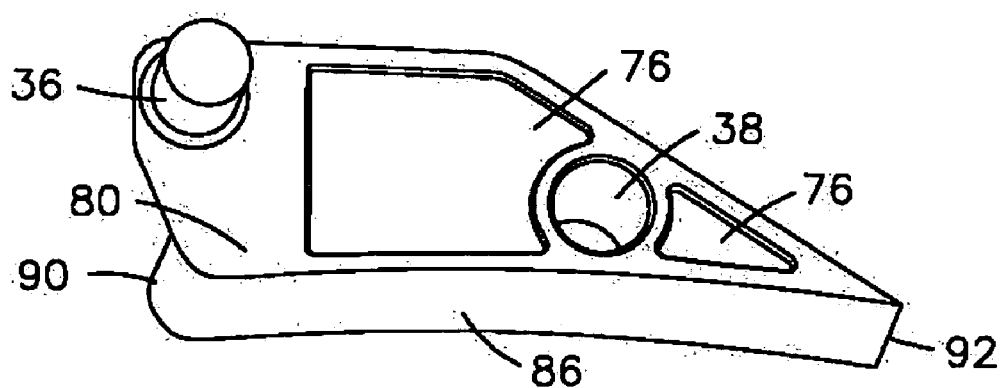
Figure 5D:
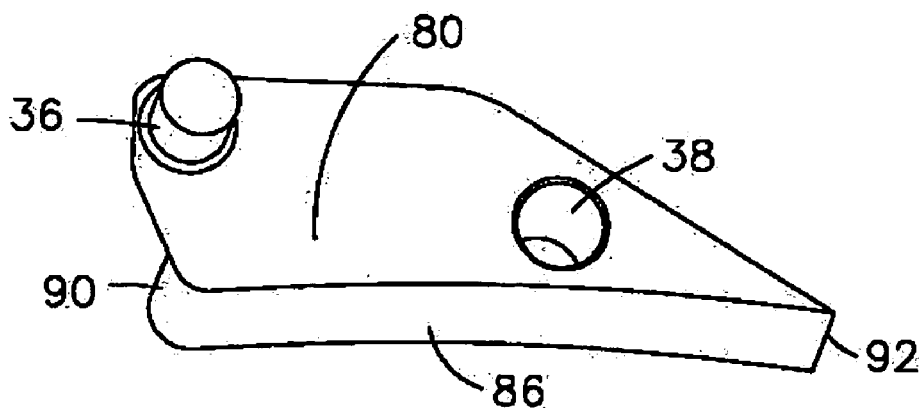
Figure 5E:
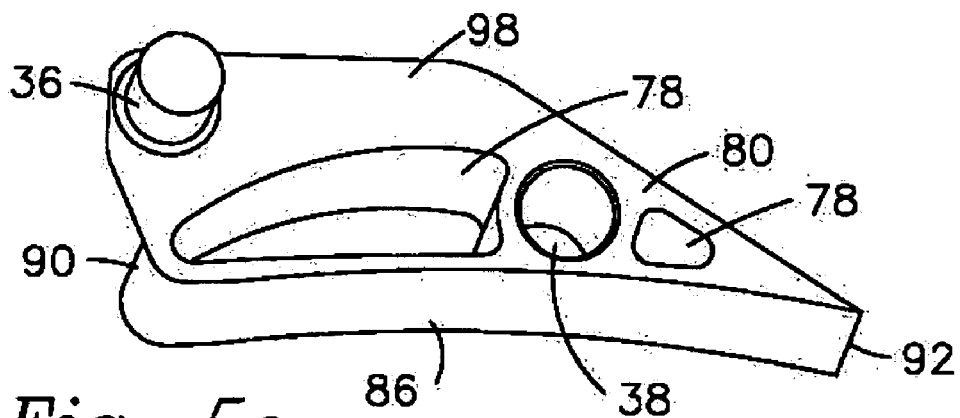
Figure 5F:
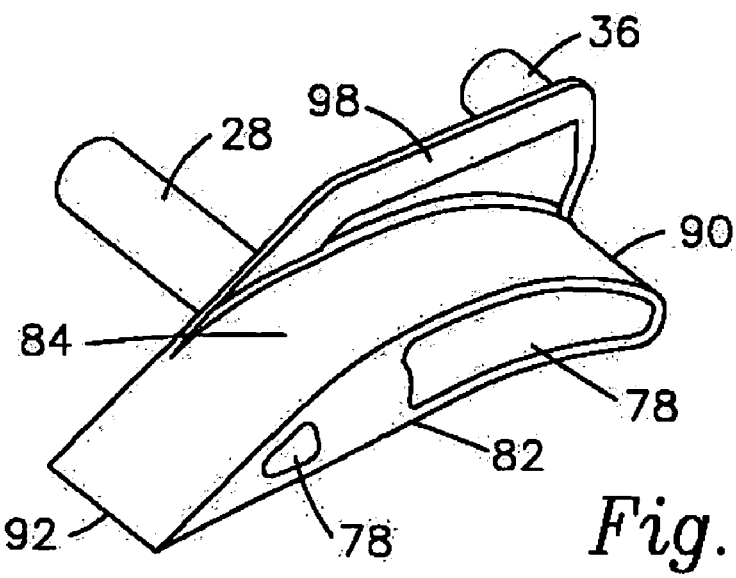
Figure 5G:
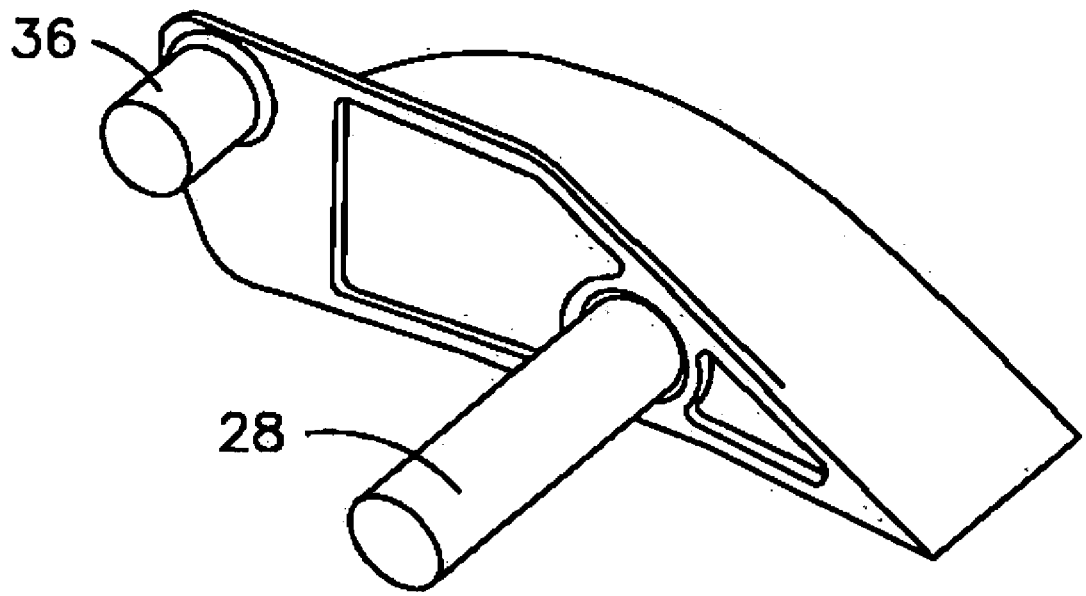
Figure 5H:
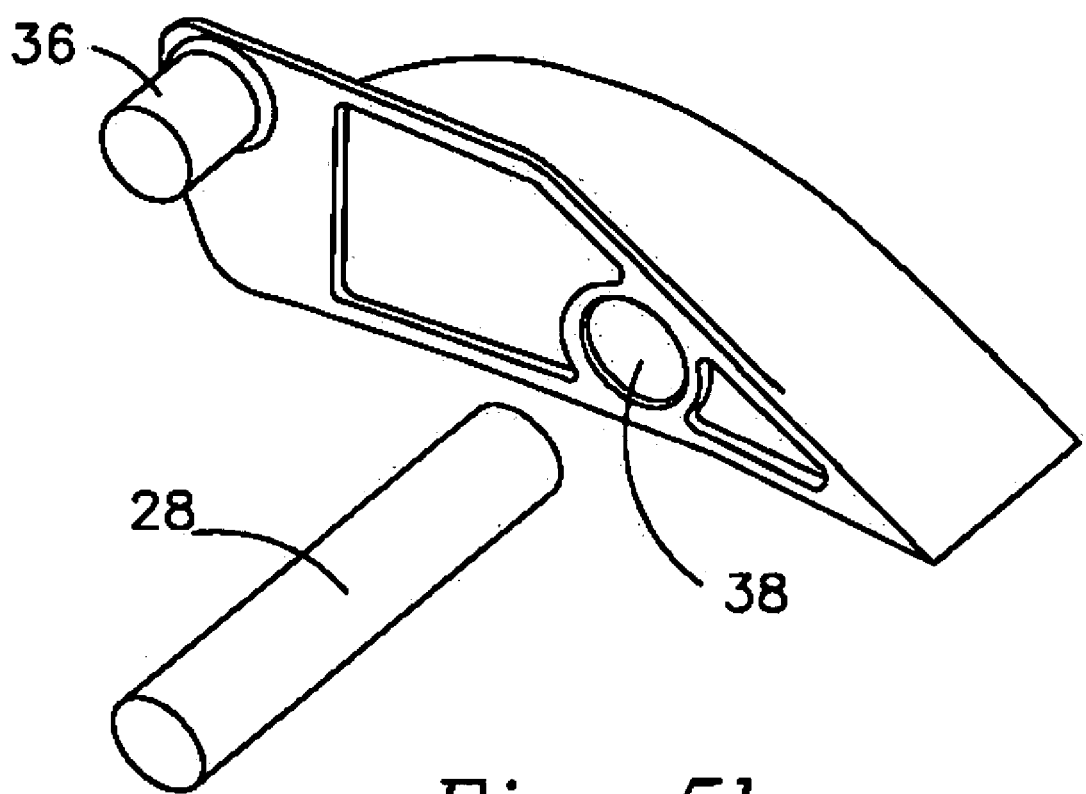
Figure 5I:
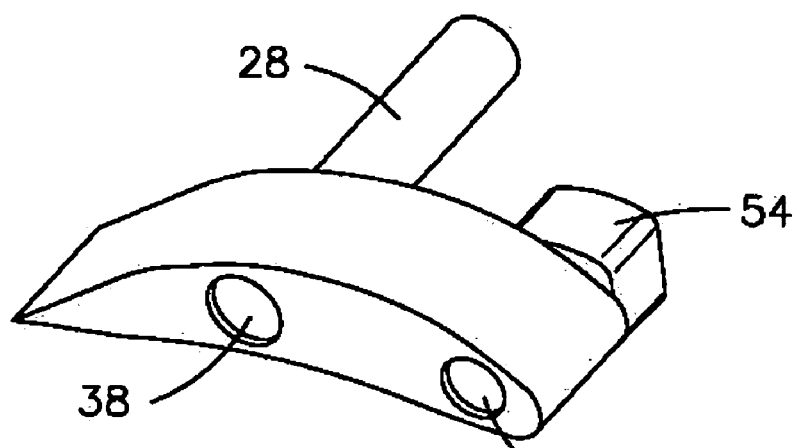
Figure 5J:
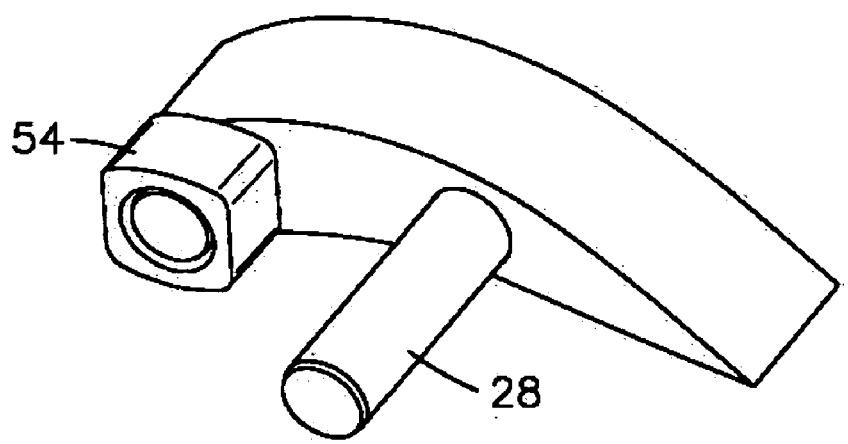
Figure 5K:
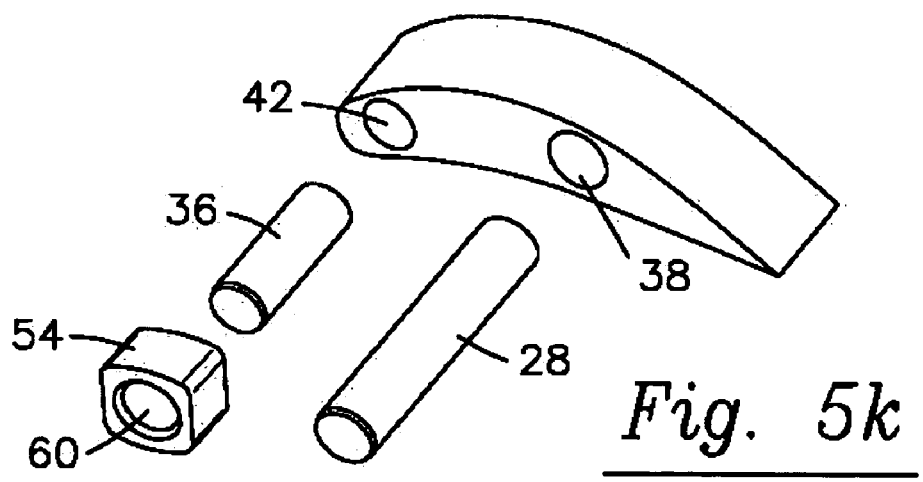

As illustrated in FIGS. 5a, 5e, and 5f, it is within the scope of the present invention to bore holes in the vanes, as designated generically by reference number 78. One purpose of such holes is that les material is needed for the vanes and the vanes so material costs would be reduced and the vanes would have less mass. It is further within the scope of the invention to recess one or more of the vane surfaces as generally indicated by reference number 76 in the figures. As also shown in various figures, the vane extension 98 may have rounded or beveled edges, or other edge treatments, to aid in the fluid dynamics of the system.

Various modifications and changes may be made by those having ordinary skill in the art without departing from the spirit and scope of this invention. Therefore, it must be understood that the illustrated embodiments of the present invention have been set forth only for the purposes of example, and that they should not be taken as limiting the invention as defined in the following claims.

We claim:

1. A vane for use in a variable geometry exhaust gas driven turbocharger, comprising: a vane body (34) adapted for pivoting around a pivot axis, said vane body (34) having first and second planar surfaces (80,82) substantially perpendicular to said pivot axis on respective axial ends; a vane bore (38) in said body, said vane bore (38) opening to at least said first planar surface (80); a vane post (28) received within said vane bore (38) such that said vane post (28) extends substantially perpendicularly from said first planar surface (80); and a single actuation post extending substantially perpendicularly from said first planar surface (80), wherein said vane post (28) and said single actuation post extend from only said first planar surface (80), whereby said vane post (28) and said single actuation post do not extend from said second planar surface (82).

2. The vane as recited in claim 1, wherein when the vane body (34) is viewed axially, a first pressure surface (84) and a second pressure surface (86) together define a footprint of the vane body (34), wherein said single actuation post is located outside of the footprint and wherein said single actuation post is attached to a vane extension (98) and said vane extension (98) is attached to said vane body (34).

3. The vane as recited in claim 2, wherein said vane extension (98) forms a portion of said first planar surface (80).

4. The vane as recited in claim 1, wherein when the vane body (34) is viewed axially, a first pressure surface (84) and a second pressure surface (86) together define a footprint of the vane body (34), wherein said single actuation post is located outside of the footprint and wherein said single actuation post operatively engages a vane extension (98) and said vane extension (98) is attached to said vane body (34).

5. A variable turbocharger geometry assembly comprising: a turbine housing (18) with at least one supply channel in said turbine housing (18) for supplying exhaust gas; at least one turbine wheel (12) rotatably supported on a shaft (16) within said turbine housing (18), said at least one supply channel being arranged to supply said exhaust gas to said at least one turbine wheel (12); a plurality of static pivot points arranged as a ring of elements (24); a ring of actuation elements (48) coaxial with said plurality of static pivot points arranged as a ring of elements (24); an array of vanes (34) adjacent to at least one of said plurality of static pivot points arranged as a ring of elements (24) and said ring of actuation elements (48), each of said vanes (34) having opposite first and second planar surfaces (80,82); vane posts (28) extending between said plurality of static pivot points arranged as a nag of elements (24) and at least said first planar surface (80) of each vane (34) of said array of vanes (34); and actuation posts (36) extending between said ring of actuation elements (48) and ax least said first planar surface (80) of each vane (34) of said array of vanes (34) wherein a pivoting movement of the rings (24, 48), relative to the other, causes pivoting movement of said array of vanes (34), and wherein said vane posts (28) and said actuation posts (36) extend from only said first planar surface (80) of each vane (34), whereby said vane posts (28) and said actuation posts (36) do not extend from said second planar surface (82).

6. The variable geometry turbocharger of claim 5, wherein said plurality of static pivot points arranged as a ring of elements (24) is a static ring having a static ring first surface (26), said ring of actuation elements (48) is an actuator ring having an actuator ring first surface (50), and said static ring first surface (26) is co-planar with said actuator ring first surface (50) and at least one of said static ring or said actuator ring has slots.

7. The variable geometry turbocharger of claim 6, wherein the static ring is affixed to a flange (25), wherein the flange (25) is a part of the turbine housing (18).

8. The variable geometry turbocharger of claim 7 wherein said static ring or said actuator ring is pivoted by a rotary electric actuator (27).

9. The variable geometry turbocharger of claim 6, wherein the static ring is affixed to a separate flange (25), wherein the flange (25) is mounted to die turbine housing (18).

10. The variable geometry turbocharger of claim 5, wherein said opposite first and second planar surfaces (80, 82) are substantially parallel.

11. The variable geometry turbocharger of claim 5, wherein said each vane post (28) is substantially perpendicular to said first planar surface (80) of a respective vane of said array of vanes (34).

12. The variable geometry turbocharger of claim 5, wherein each actuation post (36) is substantially perpendicular to said first planar surface (80) of a respective vane of said array of vanes (34).

13. A variable geometry turbocharger assembly comprising: a plurality of vane posts (28); a plurality of vanes (34), wherein each of said plurality of vanes (34) is adapted for pivoting and has first and second planar surfaces (80,82) substantially perpendicular to a pivot axis on respective axial ends of each of said plurality of vanes (34); has a vane bore (38) therein opening at least to said first planar surface (80), wherein a vane post (28) is received within said vane bore (38) of each vane (34) such that said vane post (28) extends from only said first planar surface (80), whereby said vane post (28) does no extend from said second planar surface (82); and has a single actuation post (36) extending from only said first planar surface (80), whereby said single actuation post (36) does not extend from said second planar surface (82), wherein said vane post (28) and said single actuation post both extend substantially perpendicularly from said first planar surface (80); and means for pivoting the plurality of vanes.

14. The turbocharger of claim 13, further comprising: a turbine housing (18) and a turbine housing insert ring (94) positioned between the plurality of vanes (34) and said turbine housing (18).

15. The turbocharger of claim 14, wherein said static ring and said actuator ring are concentric and positioned axially adjacent to the vanes (34).

16. The turbocharger of claim 13 wherein the means for pivoting the plurality of vanes comprises: an actuator ring having a actuator ring first surface (50) parallel to and adjacent to said vane first planar surface (80) and having a plurality of slots (52) therein substantially perpendicular to said actuator ring first surface (50) for receiving sliding blocks (54), wherein each said sliding block (54) has a respective sliding block hole (60), wherein each said sliding block hole (60) receives a respective said actuation post (36) from a respective said vane (34) and wherein each respective said sliding block (54) is slidably received by a respective said slot (52), wherein rotation of said actuator ring causes each respective said sliding block (54) to slide within a respective said slot (52), thereby moving each said actuation post (36), thus pivoting each said vane (34) radially relative to the respective said pivot axis.

17. The turbocharger of claim 13, wherein the means for pivoting the plurality of vanes comprises: an actuator ring having an actuator ring first surface (50) parallel to and adjacent to each of said vane first planar surface (80) and having a plurality of slots (52) therein substantially perpendicular to said actuator ring first surface (50) for receiving said actuation posts (36) from said vanes (34), wherein rotation of said actuator ring causes each actuation post (36) to slide within its respective said slot (52), moving each vane (34) radially relative to the respective said pivot axis.

18. The turbocharger of claim 17, further comprising: a static ring having a static ring first surface (26) coplanar to said actuator ring first surface (50), said static ring having a plurality of static ring bores (30) substantially perpendicular to said static ring first surface (26) for receiving said vane posts (28).

19. The turbocharger of claim 17, further comprising: a static ring having a static ring first surface (26) coplanar to said actuator ring first surface (50), said static ring having a plurality of static ring bores (30) substantially perpendicular to said static ring first surface (26) for receiving said vane posts (28).

20. The turbocharger of claim 19, wherein said vane posts (28) are pivotably received in said static ring bores (30) and pivotably received in said vane bores (38).

21. The turbocharger of claim 19, wherein said vane posts (28) are fixedly received in said static nag bores (30) and pivotably received in said vane bores (38).

22. The turbocharger of claim 19, wherein said vane posts (28) are pivotably received in said static ring bores (30) and fixedly received in said vane bores (38).

23. The turbocharger of claim 19, wherein said vane posts (28) are press fit in said static ring bores (30) and pivotably received in said vane bores (38).

24. The turbocharger of claim 23, wherein said vane posts (28) are pivotably received in said static ring bores (30) and pivotably received in said vane bores (38).

25. The turbocharger of claim 23, wherein said vane posts (28) are fixedly received in said static ring bores (30) and pivotably received in said vane bores (38).

26. The turbocharger of claim 23, wherein said vane posts (28) are pivotably received in said static ring bares (30) and fixedly received in said vane bores (38).

27. The turbocharger of claim 23, wherein said vane posts (28) are press fit in said static ring bores (30) and pivotably received in said vane bores (38).

28. The turbocharger of claim 27, wherein said static ring or said actuator ring is pivoted by a rotary electric actuator (27).

* * * * *